United States Patent
Yeo

(10) Patent No.: US 8,137,651 B2
(45) Date of Patent: Mar. 20, 2012

(54) METHOD FOR PREPARING HYDROPHOBIC AEROGEL AND HYDROPHOBIC AEROGEL PREPARED THEREFROM

(75) Inventor: Dong Jin Yeo, Seoul (KR)

(73) Assignee: Jung-Ho Han, Seoul (KR)

( * ) Notice: Subject to any disclaimer, the term of this patent is extended or adjusted under 35 U.S.C. 154(b) by 199 days.

(21) Appl. No.: 12/532,648

(22) PCT Filed: Mar. 27, 2008

(86) PCT No.: PCT/KR2008/001730
§ 371 (c)(1),
(2), (4) Date: Sep. 23, 2009

(87) PCT Pub. No.: WO2008/117995
PCT Pub. Date: Oct. 2, 2008

(65) Prior Publication Data
US 2010/0119432 A1    May 13, 2010

(30) Foreign Application Priority Data

Mar. 27, 2007 (KR) .......................... 10-2007-0029648

(51) Int. Cl.
*C01B 33/32* (2006.01)
*B01J 21/00* (2006.01)

(52) U.S. Cl. ....................................... 423/338; 502/233

(58) Field of Classification Search .................. 423/324, 423/335, 338, 33; 252/518.1, 519.31, 521.3; 427/212, 213, 215, 219; 502/233
See application file for complete search history.

(56) References Cited

U.S. PATENT DOCUMENTS

| 5,508,341 | A | 4/1996 | Mayer et al. |
| 5,738,801 | A | 4/1998 | Ziegler et al. |
| 5,888,425 | A | 3/1999 | Schwertfeger et al. |
| 6,017,505 | A | 1/2000 | Ziegler et al. |
| 6,129,949 | A * | 10/2000 | Schwertfeger et al. ....... 427/220 |
| 6,140,377 | A * | 10/2000 | Schwertfeger et al. ....... 516/100 |
| 6,210,751 | B1 | 4/2001 | Schwertfeger |
| 2006/0110307 | A1 * | 5/2006 | McGill et al. ................ 423/338 |

FOREIGN PATENT DOCUMENTS

| KR | 1020060023330 A | 3/2006 |
| KR | 100785521 B1 | 12/2007 |
| KR | 20080032765 A | 4/2008 |
| WO | 9506617 A1 | 3/1995 |
| WO | 9622942 A1 | 8/1996 |

(Continued)

OTHER PUBLICATIONS

Lim Law, Chung ; Mujumdar, Arun, Fluidized Bed Dryers, Handbook of Industrial Drying, Third Edition. Nov. 2006, pp. 174-199.*
Fikret Kirkbir et al., "Drying of aerogels in different solvents between atmospheric and supercritical pressures", Journal of Non-Crystalline Solids, 1998, pp. 14-18, vol. 225, Elsevier Science B.V.

*Primary Examiner* — Steven Bos
*Assistant Examiner* — Justin Bova
(74) *Attorney, Agent, or Firm* — The Webb Law Firm

(57) ABSTRACT

A method for preparing a silica aerogel in the form of permanently hydrophobic powder in a short time, wherein the silica aerogel has a high specific surface area and high functionality, and is prepared by subjecting a wet gel to a solvent exchange process and a silylizing process in a mixture solvent including a silylizing agent at the same time, the wet gel being prepared using a water glass as a raw material and adding a surfactant at a room temperature.

9 Claims, 9 Drawing Sheets

FOREIGN PATENT DOCUMENTS

| | | |
|---|---|---|
| WO | 9713721 A1 | 4/1997 |
| WO | 9717288 A1 | 5/1997 |
| WO | 9823366 A1 | 6/1998 |
| WO | 9823367 A2 | 6/1998 |

* cited by examiner

[Fig. 1]
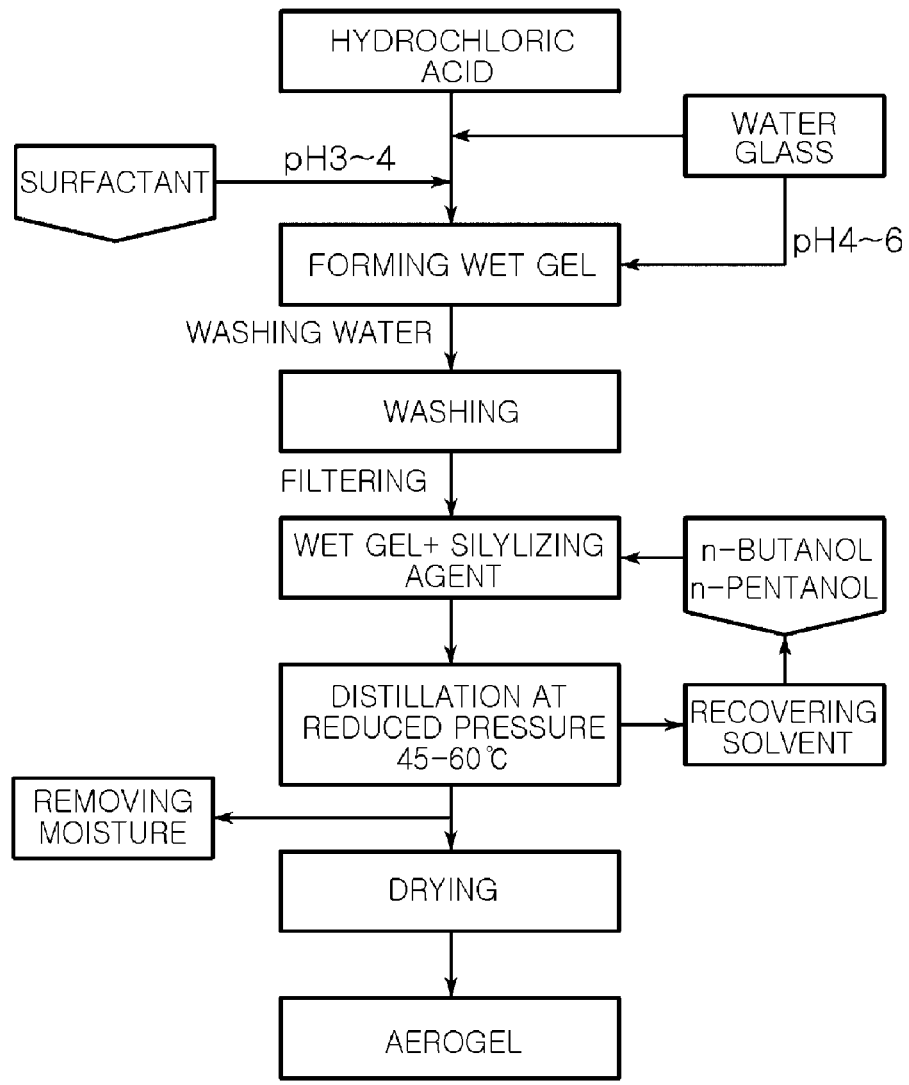

[Fig. 2]
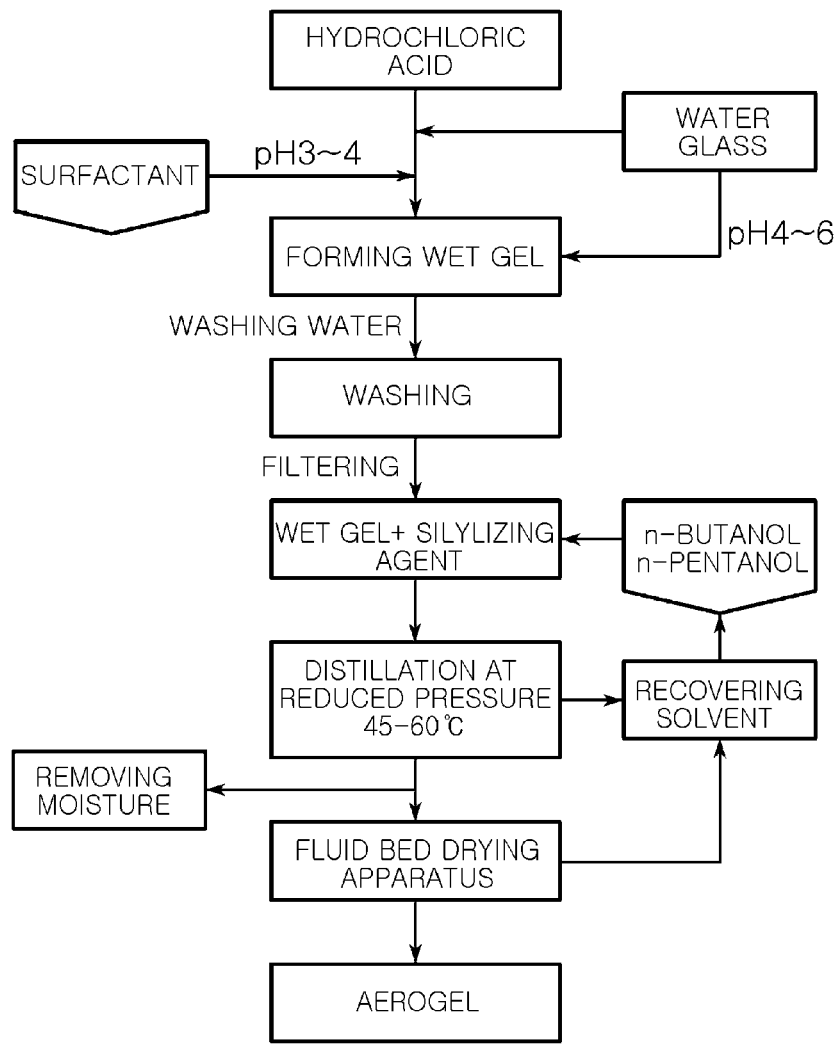

[Fig. 3]
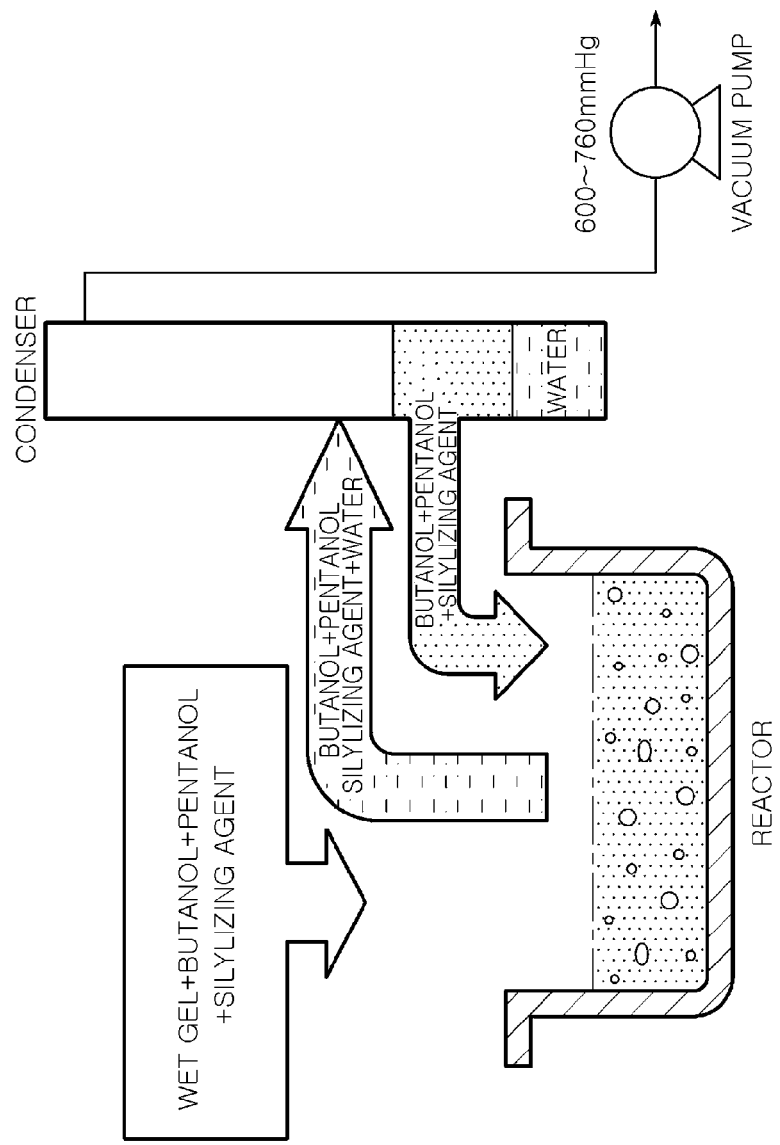

[Fig. 4]
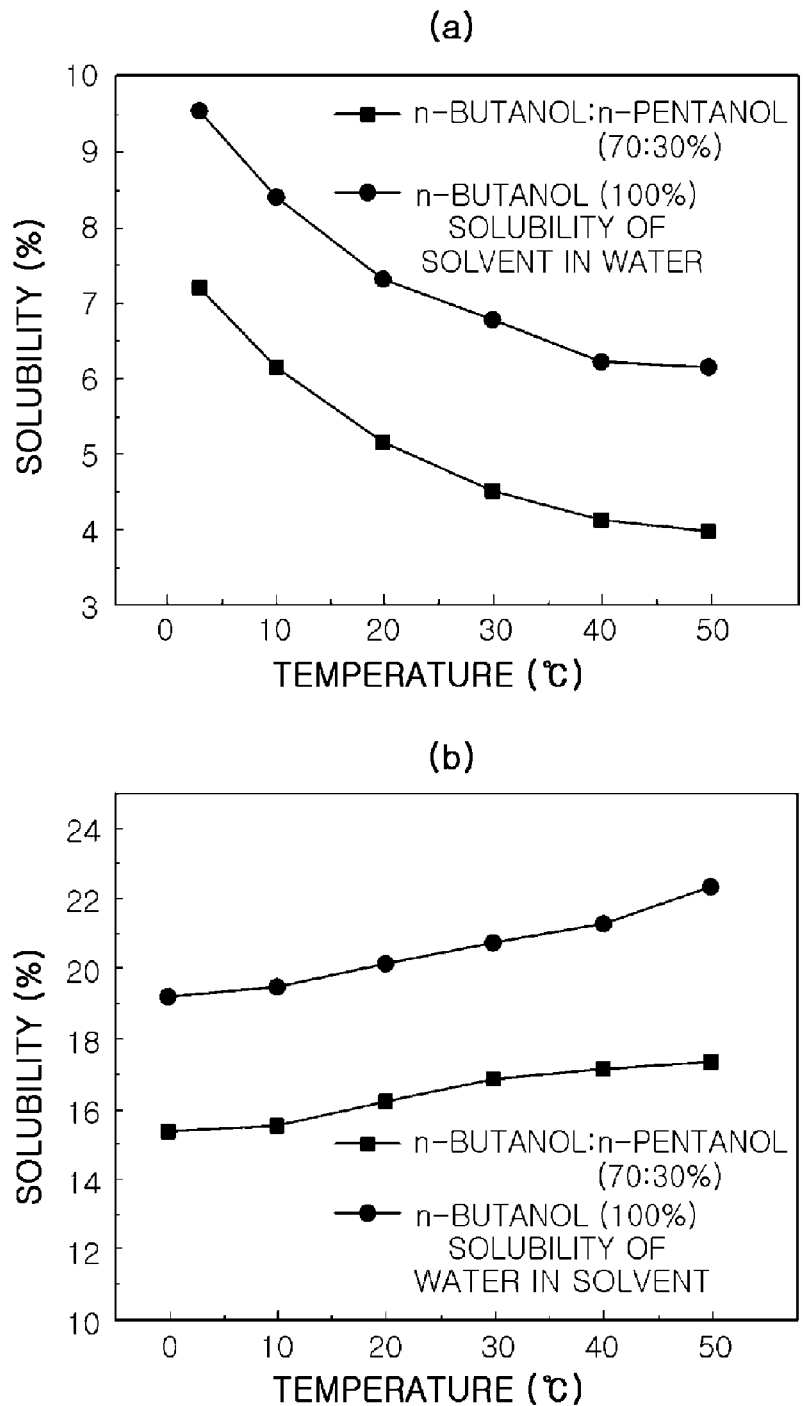

[Fig. 5]
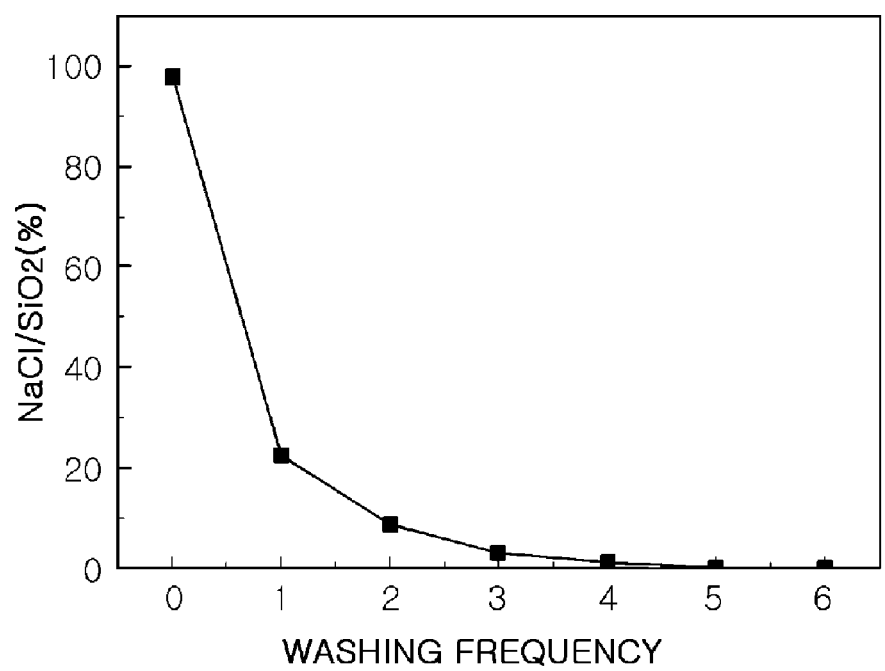

[Fig. 6]
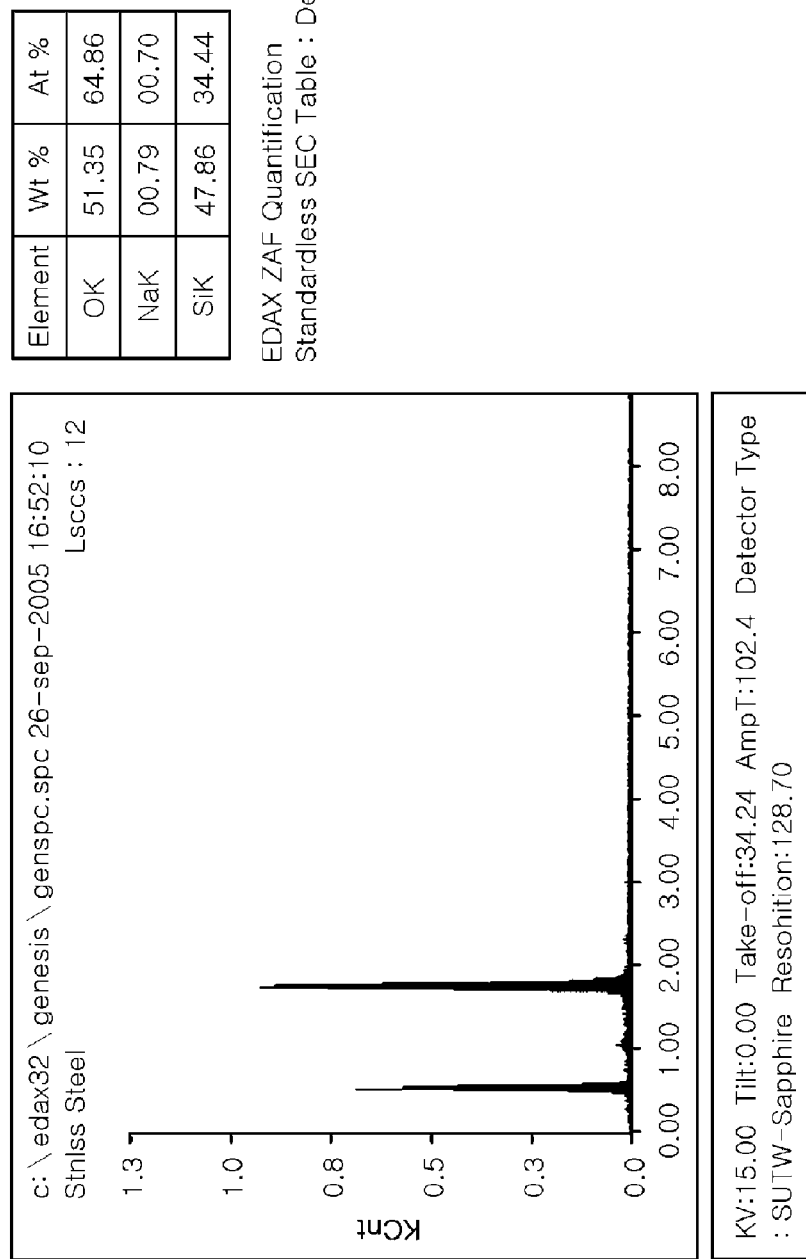

[Fig. 7]
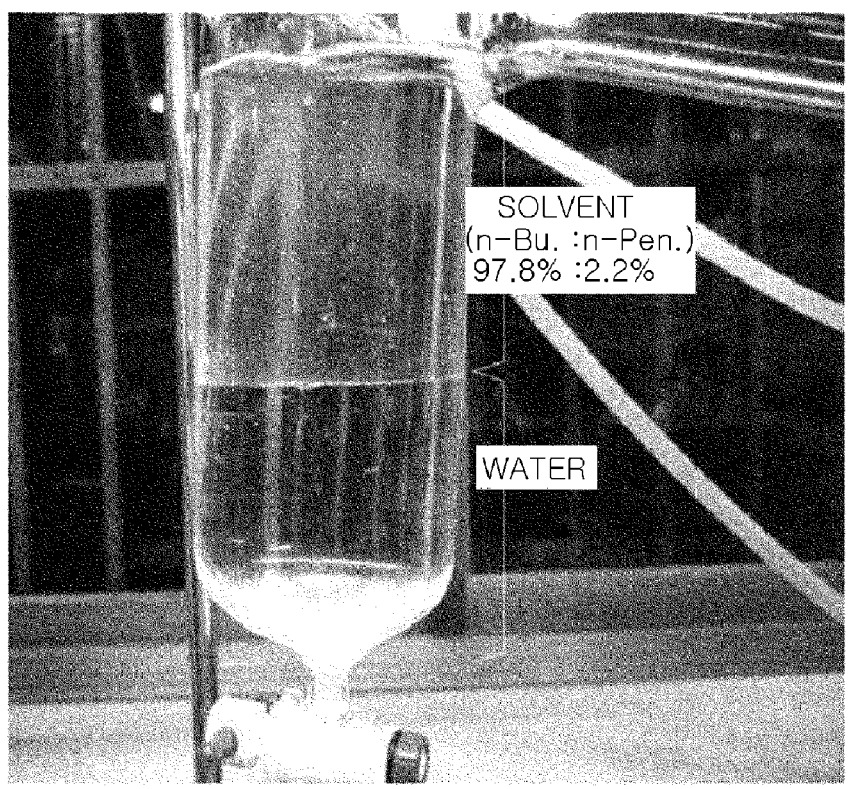

[Fig. 8]
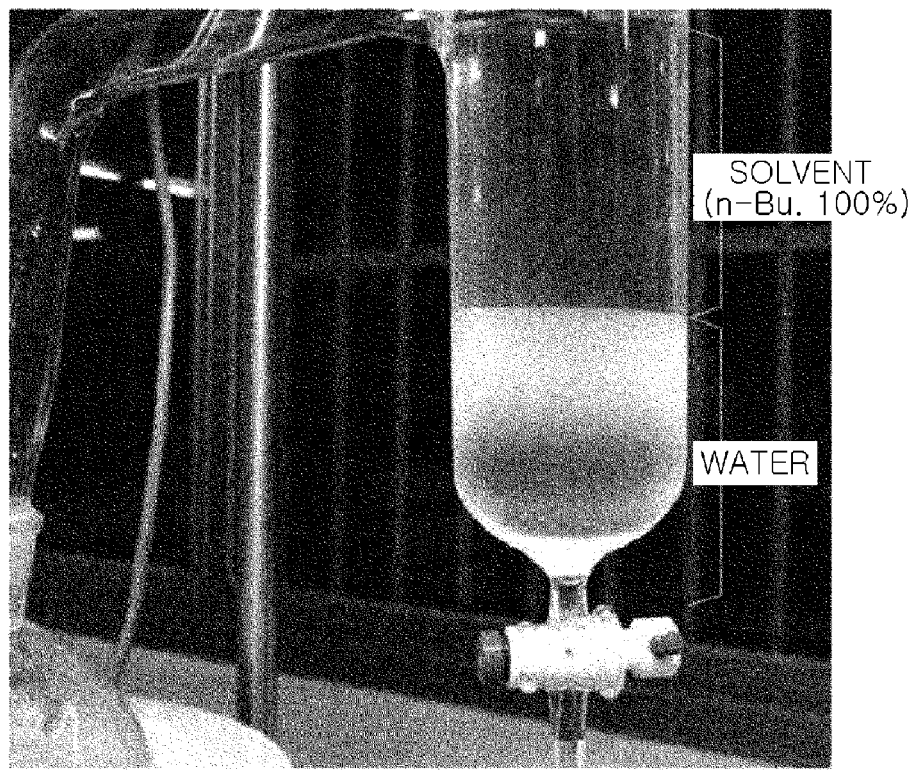

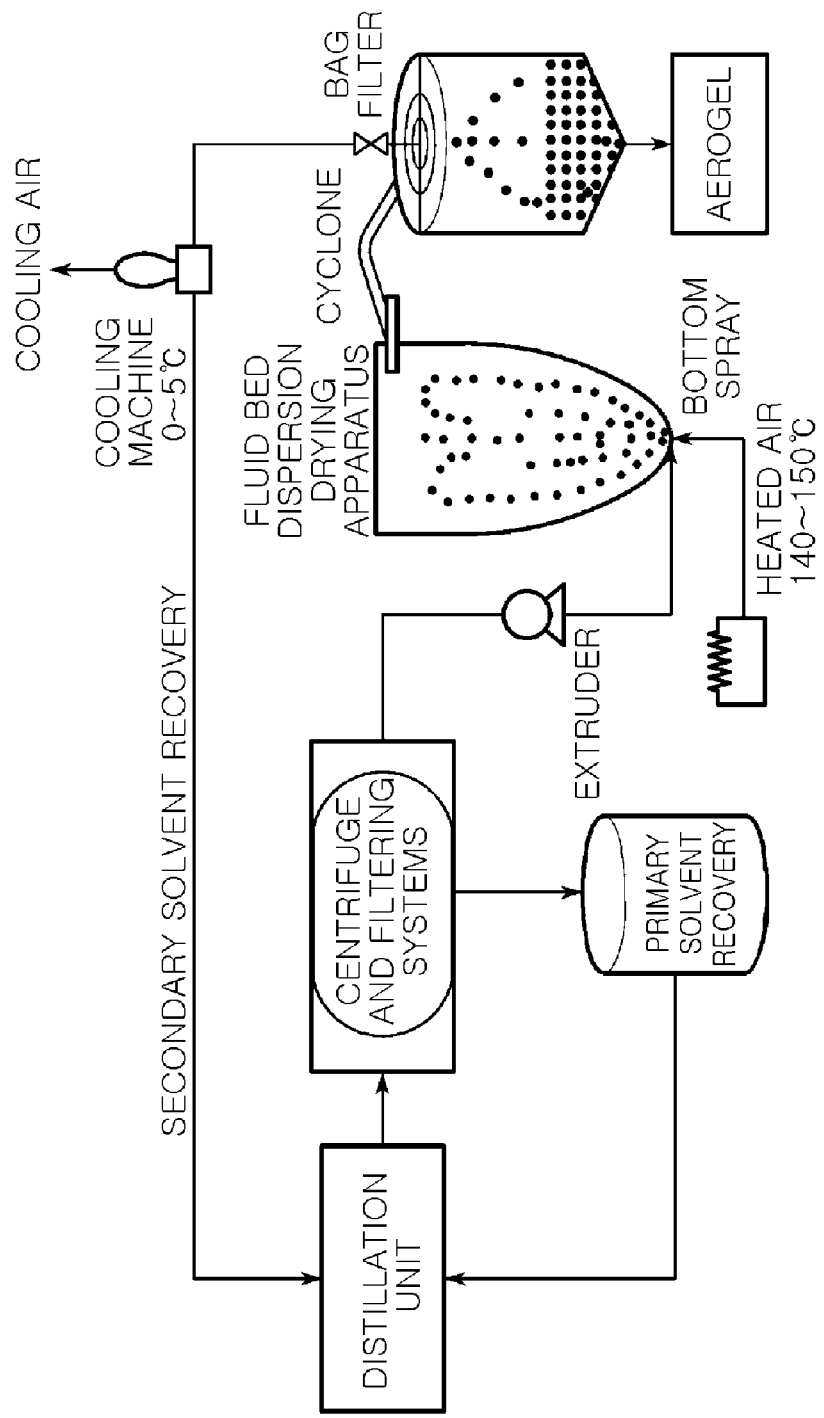
[Fig. 9]

METHOD FOR PREPARING HYDROPHOBIC AEROGEL AND HYDROPHOBIC AEROGEL PREPARED THEREFROM

TECHNICAL FIELD

The present invention relates to a method for preparing a permanently hydrophobic aerogel in a short time in an economic manner and a permanently hydrophobic aerogel prepared therefrom, and more particularly, to a method for preparing a permanently hydrophobic silica aerogel, wherein the silica aerogel may be prepared at a low temperature in a short time in an economic manner by silylizing aerogel and performing solvent exchange in a mixture solvent of n-butanol and n-pentanol using a surfactant, at the same time and it is possible to recover up to 96% (percent) of the used solvent and silylizing agent.

BACKGROUND ART

Recently, interests in aerogel have been increased as the industrial technologies become more cutting-edge. The aerogel has a porosity of 90% (percent) or more and a specific surface area of several hundreds up to about 1500 m2/g (square meter/gram), but the specific surface area may be varied, depending on the starting materials. Also, the aerogel is an advanced material having a nanoporous structure. Therefore, the nanoporous aerogel may be used in the application field such as a very low dielectric, a catalyst, an electrode material, a soundproofing material, etc. In particular, the silica aerogel is a very effective ultra heat insulating material that may be used in the fields of a refrigerator, an automobile, an airplane and the like since the silica aerogel has a low heat conductivity characteristic. This aerogel may be prepared according to various known methods. For example, WO95/06617 discloses that a hydrophobic silica aerogel is prepared by allowing a water glass to react with sulfuric acid at pH 7.5-11, washing the formed silica hydrogel with water or a diluted aqueous solution of inorganic salts (sodium hydroxide or ammonia) at pH 7.5-11 so as to remove ion components from the silica hydrogel, removing water with $C_{1-5}$ alcohol and drying the silica hydrogel at 240 to 280° C. (centigrade) under a supercritical condition of 55 to 90 bar. In the method, the supercritical drying process is carried out without undergoing a silylizing process.

WO96/22942 discloses a method for preparing an aerogel, comprising: providing a silicate lyogel; subjecting a solvent exchange process with other organic solvents (methanol, ethanol, propanol, acetone, tetrahydrofuran, etc.), if necessary; allowing the silicate lyogel to react with at least one of silylizing agent that does not include chlorine component; and drying the silicate lyogel under a supercritical condition. In the method, the solvent exchange is carried out prior to the silylizing process, and subject to the supercritical drying process.

WO98/23367 also discloses a method for preparing an aerogel, comprising: allowing acid to react with a water glass to form a lyogel; washing the lyogel with an organic solvent (alcohol (methanol, ethanol), acetone, ketone, etc.) so that a content of water can be less than 5% (percent) by weight; and followed by undergoing silylizing and drying processes. However, the solvent exchange process is carried out prior to the silylizing process.

WO97/17288 also discloses a method for preparing an aerogel, comprising: preparing a silicic acid sol having a pH of 4.0 or less from an aqueous sodium silicate solution using at least one organic and/or inorganic acid; separating salts which are formed from the acid and sodium silicate cations from the silicic acid sol at 0 to 30° C. (centigrade); polycondensing the resultant silicic acid sol to form an SiO2 gel by the addition of a base; washing the obtained SiO2 gel with an organic solvent (aliphatic alcohol, ether, ester, ketone, aliphatic or aromatic hydrocarbon) until the water content of the gel is $\leqq 5$ wt. % (weight percent); surface-silylating the obtained gel and drying. However, the solvent exchange process is carried out prior to the silylizing process.

WO97/13721 discloses a method of replacing water with C1-6 aliphatic alcohol in hydrogel particles; removing an organic solvent from a hydrogel using C1-3 alcohol, diethylether, acetone, n-pentane and n-hexane and the like; and drying wet gel at a temperature between a boiling point and a decomposition temperature of a solvent at an atmospheric pressure, and at a pressure less than a supercritical pressure of a solvent. This method is a technique that is associated with the drying at an atmospheric pressure but does not include a silylizing process. However, the method has problems that the process is complicated since it requires a 2-step solvent exchange process of replacing water with a polar solvent (butanol, etc.) and replacing the polar solvent with a non-polar solvent (pentane, etc.) for the purpose of the drying at an atmospheric pressure.

WO98/23366 discloses a method for preparing an aerogel, comprising: forming hydrogel at pH 3 or more; undergoing intermediate processes; mixing a hydrophobic agent and the hydrogel to modify a surface of the hydrogel; washing the modified hydrogel with a protic or aprotic solvent (aliphatic alcohol, ether, ester, ketone, aliphatic or aromatic hydrocarbon, etc.) or a silylizing agent, when necessary; and drying the washed hydrogel, and also discloses a for preparing an aerogel capable of being performed without undergoing the solvent exchange process since the exchange of water with other solvents is a time and energy-consuming process.

Also, there is a technique of removing moisture from silica by using butanol (n-butanol), propanol and their mixture to prepare silica whose particles have a nanosize (Korean Patent Application No. 2004-72145), and the technique comprises: precipitating a silica by adding HCl to a water glass so as to facilitate the reaction; mixing the water glass with butanol and the like; filtering and distilling the resulting mixture to remove moisture from the silica; and drying the mixture at a high temperature of 285° C. (centigrade) to prepare silica particles having a nanosize. The silica surface may be endowed with hydrophobicity since a hydroxyl group of a silica surface is changed with a butoxy group through the reaction with butanol in a solvent exchange process and a subsequent drying process. However, since the inverse reaction in the silica surface is possible through the reaction with moisture in the air, the butoxy group is exchanged with a hydrophilic group, which makes it difficult to endow the silica with permanent hydrophobicity. Therefore, there are limits to use the silica, which has been prepared according to the above-mentioned methods, in the field of the permanently hydrophobic silica particles.

Korean Patent Application No. 2006-87884 proposes a method comprising: adding a water glass (sodium silicate) to HCl to form a silica gel under an acidic condition of pH 3-5; washing the formed silica gel with distilled water and filtering the washed silica gel; mixing 1-30% (percent) by weight of a silylizing agent, such as hexamethyldisilane, ethyltriethoxysilane, triethylethoxysilane, ethyltrimethoxysilane and methoxytrimethylsilane, with 70-99% (percent) by weight of alcohols (methanol, ethanol, propanol, etc); refluxing the resulting silica gel 4-12 hours to modify a surface of the silica; filtering the surface-modified silica; and performing a solvent exchange of the silylized silica gel with n-butanol to remove moisture and reaction residues from the silica gel at the same time. However, the method has disadvantages that it is impossible to recover the used silylizing agent and alcohol solution since the silylizing agent remains mixed with the alcohol solution, and the cost of the products is very high since the expensive silylizing agent is used in a large amount, and thus it is unfavorable in respect of economical efficiency.

Korean Patent Application No. 2006-98643 briefly describes the context of the previous patent application as one step, and proposes a method comprising: adding a water glass (sodium silicate) to HCl to form asilica gel under an acidic condition of pH 3-5; washing the formed silica gel with distilled water and filtering the washed silica gel; adding a silylizing agent, such as hexamethyldisilane, ethyltriethoxysilane, triethylethoxysilane, ethyltrimethoxysilane and methoxytrimethylsilane, to n-butanol solution; and silylizing the silica gel and removing moisture and reaction residues from the silica gel at the same time. However, the method needs a reaction time from at least 4 hours up to 24 hours, and requires multiple processes of filtering the silica gel after the reaction process and recovering the solvents and the silylizing agent from the separated cake in a separate drying system so as to obtain the final silica particles. Also, the method has a problem that about 10% (percent) of butanol may be inevitably lost according to a solubility curve of water and butanol as shown in FIG. 3. Butanol is expensive, but the silylizing agent that is expensive several hundred times more than the butanol may be lost with its being dissolved in the butanol, and therefore the method also has very serious problems in respect of economical efficiency. Recycled solvents may be degraded in quality since a relatively large amount of water is dissolved into the recovered butanol solvent. Furthermore, there is a limit to the aerogel having a relative low specific surface area, that is, a specific surface area of 600-700 m2/g (square meter/gram), which is referred to as one disadvantage of the method in which a water glass is used instead of TEOS as a starting material.

Accordingly, the present invention is designed to solve such drawbacks of the prior art, and therefore an object of the present invention is to provide a method for preparing a permanently hydrophobic silica aerogel powder having a higher specific surface area, the silica aerogel powder being prepared by preparing a wet gel having a higher specific surface area at an atmospheric pressure condition using a surfactant, and subjecting the wet gel to a one-step process at a low temperature in a short time, wherein the method is able to recover up to 96% (percent) of the used solvents and silylizing agent.

Also, another object of the present invention is to provide a permanently hydrophobic aerogel having a high specific surface area, prepared according to the method of the present invention.

SUMMARY OF THE INVENTION

According to an aspect of the present invention, there is provided a method for preparing an aerogel whose surface has permanent hydrophobicity, the method comprising the steps of:

A) adding a water glass (sodium silicate) to 0.5-2N HCl at a room temperature until the pH of solution is adjusted to 3 to 4;

B) forming a silica gel by adding 1.5-10% (percent) by weight of a non-ionic surfactant to the resulting solution in the step A), based on the total weight of the finally prepared silica powder particles, and by adding water glass so that the solution is under an acidic condition of pH 4-6;

C) washing the formed silica gel with distilled water and filtering the washed silica gel;

D) adding a mixture solvent of 1-40% (percent) by weight of n-pentanol and 99-60% (percent) by weight of n-butanol to the silica gel and further adding a silylizing agent;

E) putting the mixture solution of the silica gel, the mixture solvent and the silylizing agent into a reactor, separating the solvent and moisture while maintaining a pressure level of 200 to 30 mmHg (millimeter Hg) at a temperature of 45 to 60° C. (centigrade) in a reactor, and then removing the moisture and refluxing the solvent again, followed by repeating this process until the moisture is completely removed from the silica gel; and F) closing a reflux line when the moisture is removed from the silica gel, and drying the solvent from the silica gel until the silica gel is prepared in the powder form.

According to another aspect of the present invention, there is provided an aerogel prepared therefrom, the aerogel having a permanently hydrophobic surface.

According to still another aspect of the present invention, there is provided a method for preparing an aerogel whose surface has permanent hydrophobiccity, the method including: instead of the last step F) of preparing an aerogel in the above method, drying the silica gel in a fluid bed dispersion dryer and recovering the solvent at the same time when the moisture is removed from the silica gel.

According to yet another aspect of the present invention, there is provided an aerogel prepared therefrom.

BRIEF DESCRIPTION OF THE DRAWINGS

FIGS. 1 and 2 are schematic views illustrating a preparation method according to one exemplary embodiment of the present invention;

FIG. 3 is a diagram illustrating a reactor system of a reaction solvent and a silylizing agent, and a solvent recovery system, both of which are used in the present invention;

FIG. 4 A shows solubility curve of n-butanol in water, and a solubility curve of a mixture solution including n-butanol and n-pentanol in water, and FIG. 4 B shows solubility curve of water in n-butanol, a solubility curve of water in a mixture solution including n-butanol and n-pentanol;

FIG. 5 is a diagram illustrating purity of a silica wet gel according to the washing number of the silica wet gel prepared in the present invention;

FIG. 6 shows the results obtained by washing a silica wet gel, prepared according to the method of the present invention, 6 times and measuring purity of the silica gel powder, using an EDAX analysis method, wherein the silica gel powder includes the majority of $SiO_2$ and 0.79% (percent) of Na component;

FIG. 7 is a photograph illustrating that a solvent phase is separated from a water phase according to the method of the present invention, the solvent and water phases being recovered in a cooling machine using a mixture solvent of n-butanol and n-pentanol;

FIG. 8 is a photograph illustrating that a solvent phase is separated from a water phase according to the conventional method when only n-butanol is used as the solvent; and FIG. 9 is a schematic view illustrating one example of a fluid bed dispersion drying apparatus according to the present invention.

BEST MODE FOR CARRYING OUT THE INVENTION

Hereinafter, exemplary embodiments of the present invention will be described in detail.

The present invention is directed to a novel method for preparing a hydrophobic aerogel capable of preparing a wet gel from a water glass using a surfactant, the wet gel having a higher specific surface area than wet gels prepared according to the conventional methods, and recovering a silylizing agent and solvents by performing a one-step process at a reduced pressure within a processing time of 60 minutes in a reactor, the one-step process including: very quickly separating and removing moisture from the silica wet gel; and hydrophobically treating a surface of the silica gel so that the silica gel can be endowed with permanent hydrophobicity; and reusing the remaining silylizing agent and solvents.

Also, the method according to the present invention is characterized in that a recovery rate of the solvent and the expensive silylizing agent may be increased and the purity of the recovered solvents may be improved by using, as a solvent, a solution in which n-pentanol is mixed with n-butanol.

According to the method of the present invention, firstly, a water glass, such as sodium silicate, is added to HCl at a room temperature until the pH of the solution is adjusted to 3 to 4, and maintained in a transparent state right before a silica gel is formed, as shown in FIGS. 1 and 2. At this time, a non-ionic surfactant selected from the group consisting of propylene glycol ester, glycerine ester, polyethyleneglycol, JFC™ (Trademark) and alkylcellulose is added at a content of 1.5-10% (percent) by weight, based on the total weight of the finally prepared silica powder particles, and mixed thoroughly. Then, the silica is slowly polymerized in the solution to form a silica gel as the pH of the solution is adjusted to a pH range of 4 to 6 with the addition of an additional water glass. In this case, if the surfactant is previously added to hydrochloric acid or a water glass before the reaction, and reacts with each other, or is added to the mixture after the formation of the silica gel, it is impossible to obtain the optimum effects since the surfactant is not dispersed in a suitable manner. That is to say, when the silica develops into nanosize particles while being polymerized from molecular silica, the surfactant should surround the silica particles to reduce $\xi$(xi)-potential of the silica particles in the solution. As a result, the nanosize particles may be loosely grown later to form a silica gel having a high specific surface area. An amount of the added surfactant is in a range of 1.5-10% (percent) by weight, based on the total weight of the finally prepared silica powder particles. When the amount of the surfactant is less than 1.5% (percent) by weight, the addition effects are poorly obtained, whereas the specific surface area is increased slightly when the amount of the surfactant exceeds 10% (percent) by weight, and therefore this is undesirable in aspect of economical efficiency. Through this reaction, it is possible to obtain an aerogel gel having a high specific surface area spanning from 830 to 860 m²/g (square meter/gram).

Since NaCl formed through a side reaction with the remaining surfactant is present in the silica gel prepared thus, the silica gel should be washed. In the case of the washing operation, an amount of Na may be adjusted to 0.79% (percent) or less, as shown in the analysis results of FIG. 6, when the silica gel should be washed at least 5 or 6 times with an amount of washing water that corresponds to about 10 times the weight of the final solid-phase silica aerogel powder, as shown in FIG. 5. When the silica gel is finally filtered after the washing operation, it is possible to obtain a wet gel containing about 80 to 85% (percent) of moisture. In subsequent processes, the moisture is effectively separated and removed from the silica gel, and the silica gel is subject to a process for endowing a surface of the silica gel with permanent hydrophobicity.

In order to effectively separate and remove moisture from the wet gel and endow a surface of the silica with permanent hydrophobicity, a mixture solvent including 99-60% (percent) by weight of n-butanol and 1-40% (percent) by weight of n-pentanol are added to a reactor system as shown in FIG. 3, and at least one silylizing agent selected from the group consisting of methoxytrimethylsilane (MTMS), hexamethyldisiloxane (HMDSO), hexamethyldisilane (HMDS) and trimethoxymethylsilane (TMMS) is added at a content of 1-20% (percent) by weight, based on the total weight of the solvent, and the resulting mixture reacts together with the wet gel. When the silylizing agent is present in a very low content of 1% (percent) by weight or less, the silylizing operation does not effective, whereas it is undesirable in respect of economical efficiency, and the apparent specific gravity of the silica powder tends to be increased when the silylizing agent is present in a very high content of 20% (percent) by weight or more. In this case, when only the n-butanol is used as the solvent, approximately 10% (percent) by weight loss of the solvent is inevitable due to the solubility of n-butanol in water, as shown in FIG. 4, and the more fatal fact is that the very expensive silylizing agent, which has been dissolved in the solvent, is also lost together with the solvent. Therefore, it is a very critical and important factor to maximally reduce their loss so as to actually apply to the process. Also, a significant amount of moisture is present in the recovered solvent due to the solubility of water in n-butanol, as shown in FIG. 4, which leads to the degraded quality of the recycled solvent. In this case, for the mixing ratio of n-butanol and n-pentanol, the addition effects is very slight due to the very low content when the n-pentanol is present in a content of 1% (percent) by weight or less, whereas the reaction time may be extended due to the too high boiling point of the solvent and the energy cost is excessively high during the reaction at a reduced pressure when the content of the n-pentanol exceeds 40% (percent) by weight. Since the n-pentanol is more expensive than n-butanol, the n-pentanol is undesirable in the economic aspect when the n-pentanol is used in a content of more than 40% (percent) by weight. Referring to the solubility curve as shown in FIG. 4, it is revealed that the solubility of the solvent in water is lower by 3-5% (percent) when n-butanol and the n-pentanol are mixed in a weight ratio of 7:3 than when the n-butanol is used alone. Also, the purity of the recovered n-butanol is in a range of 90-96% (percent) when the n-butanol is used alone, but the purity of the recovered solvent is in a range of 96-98% (percent) when the n-butanol and the n-pentanol are mixed in a weight ratio of 7:3. This is why moisture is primarily distilled through a distillation process and a cooling process in the process of removing moisture from the wet gel.

Also in this process, a mixture solution of a wet gel, a solvent and a silylizing agent is added to a reactor, and the mixture reacts while maintaining a pressure level of 200-30 mmHg (millimeter Hg) at a temperature of 45-60° C. (centigrade) in the reactor. The surface of the wet gel is made hydrophobic by the reaction, i.e. silyation.

If the process is carried out at an atmospheric pressure, the process should need a reaction time from at least 4 hours up to 24 hours so as to separate and remove the moisture from the wet gel, and also maintain a temperature in the reactor to a temperature level of 120-150° C. (centigrade). However, the reaction time may be shortened by performing the reaction while maintaining a pressure in the reactor to a pressure level of 200-30 mmHg (millimeter Hg). Therefore, it is possible to reduce the reaction time within 60 minutes only when the minimum pressure in the reactor is 200 mmHg (millimeter Hg) or less. As a result, the lower pressure makes it possible to increase a reaction rate, but makes it very difficult to actually apply to the process at a pressure of less than 30 mmHg (millimeter Hg) due to the loss in pressure drop of connecting lines or a vacuum pump that are coupled to the reactor. The temperature in the reactor should be maintained to a temperature level of 45-60° C. (centigrade). This is why the temperature in the reactor is spontaneously lowered since the heat rapidly emits from the solvent, and therefore it is desirably to supply the heat from the outside for the purpose of the rapid reaction time.

According to the above-mentioned process, the moisture may be completely separated from the wet gel within 60 minutes, and the solvent is separated in a cooling tube or a centrifuge, and used again. In this case, when the recovered solvent is distilled in a reduced pressure system without being re-introduced into the reactor, the silica aerogel may be immediately dried within 20 minutes in the reactor to obtain the final product of a permanently hydrophobic powder silica aerogel.

However, alternately, a permanently hydrophobic aerogel may also be produced by drying the silica gel in a fluid bed dispersion drying apparatus and recovering the solvent at the same time when the moisture is removed from the silica gel as shown in FIG. 2. In addition, the solvent is primarily recovered when the moisture is also completely removed from the wet gel, and the moisture-free wet gel is transferred to a fluid bed dispersion drying apparatus such as a separate final powder device using a forcible transfer system such as an extruder, and then pulverized into powder in the fluid bed dispersion drying apparatus. The primary recovery of the solvent may be carried out in a dehydrating unit (e.g., a centrifugal and filtering apparatus), for example by primarily recovering the solvent so that a weight ratio of the solid-phase material: the solvent can range from approximately 1:3 to 1:5.

When the solvent is less than a weight ratio of 3:1 in relation to the solid-phase material, the silica gel is excessively made into powder, and therefore the solvent recovering process is meaningless and it is difficult to transfer the wet gel to the drying apparatus, and unnecessary energy is increasingly consumed when the content of the solvent is greater than a weight ratio of 5:1 in relation to the solid-phase material. This process has a problem that it is complicated as a two-step process, compared to the one-step process as described previously. However, this process has an advantage that the energy, which is consumed to evaporate the solvent from a large number of fine pores in the silica, may be lowered by physically passing through the primary solvent recovery.

The two processes are selectively applicable, when necessary. In the use of the fluid bed dispersion drying apparatus, it is the most desirable in the aspect of energy efficiency to adjust a temperature in the drying apparatus to a temperature level of 140-200° C. (centigrade). When the temperature in the drying apparatus is adjusted to less than 140° C. (centigrade), the drying time is delayed, and a fluid bed dispersion drying apparatus is increased in size. On the contrary, the hydrophobically treated silylizing groups may be lost due to the thermal degradation when the temperature in the drying apparatus exceeds 200° C. (centigrade). Finally, the temperature and time that are suitable for the drying process properly are determined, depending on the suitable volume of the fluid bed dispersion drying apparatus. Further, the drying time and temperature may be properly determined to remove all of the solvent, apparent to those skilled in the art.

MODE FOR THE INVENTION

Hereinafter, exemplary embodiments of the present invention will be described in detail. However, it should be understood that the detailed description and specific examples, while indicating preferred embodiments of the invention, are given by way of illustration only, without departing from the scope and spirit of the present invention.

Example 1

A water glass solution (a solution in which 35 wt % (weight percent) of sodium silicate solution is diluted 3 times with water) was added to 5 L (liter) of 1N hydrochloric acid solution at a room temperature while stirring until the pH of the resulting solution is adjusted to pH 3.5. After one hour of the stirring, 3% (percent) by weight of polyethyleneglycol was added to the water glass solution, based on the total weight of the finally prepared silica powder particles, and pH of the resulting solution was slowly increased to pH 5 with the addition of water glass. Gel started to appear when the water glass solution was further stirred for about 2 hours. The wet gel prepared thus was washed several times with a sufficient amount of distilled water so as to remove Na ions, Cl ions and the remaining surfactant, all of which are present inside the wet gel, and dehydrated through the sufficient filtering. Then, 300 mL (milliliter) of n-pentanol was mixed with 2500 mL (milliliter) of n-butanol, and 5% (percent) by weight of hexamethyldisiloxane (HMDSO) was added to the resulting mixture, and 10% (percent) by weight of trimethoxymethylsilane (TMMS) was then added thereto, based on the total weight of the solvent.

About 750 g (gram) of a silica wet gel was put into the resulting mixture, and the moisture was separated in a condenser while maintaining a pressure in a reactor to a pressure level of 120 mmHg (millimeter Hg) at 50~55° C. (centigrade) and the solvent was recovered and refluxed. As a result, the moisture may be completely separated from the wet gel within 60 minutes.

In this case, a phase separation appeared clearly between water and solvent in the wet gel, as shown in FIG. 7. When the moisture was removed completely, a reflux line was closed, and the silica wet gel was continuously distilled at the reduced pressure of 120 mmHg (millimeter Hg) to evaporate the solvent. About 200 g (gram) of a silica powder whose surface was silylized was obtained within 10-20 minutes. Here, n-butanol, n-pentanol, hexamethyldisiloxane (HMDSO) and trimethoxymethylsilane (TMMS) were recovered, and thus reused several times with the additional little supplement of them. In this case, 96% (percent) by weight of the solvent was recovered, and the purity of the recovered solvent was 99% (percent).

The aerogel prepared thus had a permanently hydrophobic surface, and showed a specific surface area of 840 m2/g (square meter/gram).

Comparative Example 1

A water glass solution (a solution in which 35% (percent) by weight of sodium silicate solution is diluted 3 times with water) was added to 5 L (liter) of 1N hydrochloric acid solution at a room temperature until the pH of the resulting solution is adjusted to pH 5. Gel started to appear when the water glass solution was further stirred for about 2 hours. The wet gel prepared thus was washed several times with a sufficient amount of distilled water, and dehydrated through the sufficient filtering.

Then, about 750 g (gram) of a silica wet gel was added to 3000 ml (milliliter) of n-butanol and then 5% (percent) by weight of methoxytrimethylsilane (MTMS) was added thereto, based on the total weight of the solvent and the resulting mixture was heated to 130° C. (centigrade), moisture was separated in the condenser. When only n-butanol was used as the solvent, it was seen that a phase separation did not appear clearly between a moisture phase and a solvent phase but an interface layer is formed between them, as shown in FIG. 8. The interface layer is in a state in which water and an n-butanol solvent are mixed with each other. Therefore, this phenomenon leads to the increased loss of the solvent, n-butanol. In this comparative example, about 750 g (gram) of a wet gel was used herein, and the moisture in the wet gel is present in a content of about 85% (percent) by weight, which corresponds to about 640 g (gram). Since the solubility of butanol in water is theoretically 8 g (gram)/100 g (gram) $H_2O$, approximately 50 g (gram) of butanol was lost its being purely dissolved in the water. Further, since the loss of solvent caused by the layer formation in the interface was in a range of approximately 200 to 250 ml (milliliter) as shown in FIG. 8, a significant amount of the solvent may be lost. In this case, 90% (percent) by weight of the solvent was recovered, and the recycled solvent had a purity of 94% (percent). This phenomenon may be reduced by using a solvent system in which an n-pentanol solution is mixed with n-butanol.

Comparative Example 2

A water glass solution (a solution in which 35% (percent) by weight of sodium silicate solution is diluted 3 times with water) was added to 5 L of 1N hydrochloric acid solution at a room temperature while stirring until the pH of the resulting solution is adjusted to pH 5. Gel started to appear when the water glass solution was further stirred for about further 2-3 hours. The wet gel prepared thus was washed several times with a sufficient amount of distilled water so as to remove Na ions and Cl ions, all of which are present inside the wet gel, and dehydrated through the sufficient filtering. Then, about 750 g (gram) of a silica wet gel was put into 3000 ml (milliliter) of n-butanol, and 5% (percent) by weight of hexamethyldisiloxane (HMDSO) was then added thereto based on the total weight of the solvent, and the resulting mixture reacted at 150° C. (centigrade) for 20 hours. In this case, all of moisture in the wet gel may be removed through the condenser. Then, the wet gel was filtered and dried at 200° C. (centigrade) for 4 hours in a drying apparatus to obtain a silica aerogel powder. As a result, the silica aerogel powder had a specific surface area of 668 m2/g (square meter/gram), and the recovery of the n-butanol was 90.5% (percent).

Example 2

A water glass solution (a solution in which 35% (percent) by weight of sodium silicate solution is diluted 3 times with water) was added to 5 L of 1N hydrochloric acid solution at a room temperature while stirring until the pH of the resulting solution is adjusted to pH 3.5. After one hour of the stirring, 3% (percent) by weight of polyethyleneglycol was added to the water glass solution, based on the total weight of the finally prepared silica powder particles, and pH of the resulting solution was slowly increased to pH 5 with the addition of water glass. Gel started to appear when the water glass solution was further stirred for about 2 hours. The wet gel prepared thus was washed several times with a sufficient amount of distilled water so as to remove Na ions, Cl ions and the remaining surfactant, all of which are present inside the wet gel, and dehydrated through the sufficient filtering. Then, 400 ml (milliliter) of n-pentanol was mixed with 2500 ml (milliliter) of n-butanol, and 5% (percent) by weight of hexamethyldisiloxane (HMDSO) was added to the resulting mixture, and 10% (percent) by weight of methoxytrimethylsilane (MTMS) was then added thereto, based on the total weight of the solvent. About 750 g (gram) of a silica wet gel was put into the resulting mixture, and the moisture was separated in a condenser while maintaining a pressure in a reactor to a pressure level of 120 mmHg (millimeter Hg) at 55° C. (centigrade) and the solvent was recovered and refluxed. As a result, the moisture may be completely separated from the wet gel within 60 minutes. Then, the solvent was physically recovered in a dehydrator (e.g. centrifuge and filtering system) until a weight ratio of a solid phase and the solvent is in a range of 1:4 to 1:5, and the wet gel sample was transferred to a fluid bed dispersion drying apparatus as configured in FIG. 9, and then dried in the fluid bed dispersion drying apparatus. A temperature of a fluid bed dispersion drying apparatus was adjusted to a temperature level of 150° C. (centigrade), raw materials were fed continuously, the silica power was primarily captured in an upper portion of the fluid bed dispersion drying apparatus using a Cyclone collector, and then collected using a bag filter. In this case, the evaporated solvent was collected in a condensation system provided with a cooling machine.

The aerogel prepared thus had a permanently hydrophobic surface, and showed a specific surface area of 850 m2/g (square meter/gram). Also, 96% (percent) by weight of the solvent was recovered.

Comparative Example 3

A water glass solution (a solution in which 35% (percent) by weight of sodium silicate solution is diluted 3 times with water) was added to 5 L of 1N hydrochloric acid solution at a room temperature while stirring until the pH of the resulting solution is adjusted to pH 5. Gel started to appear after the water glass solution was stirred for 3 hours. The wet gel prepared thus was washed several times with a sufficient amount of distilled water so as to remove Na ions and Cl ions, all of which are present inside the wet gel, and dehydrated through the sufficient filtering. Then, 400 ml (milliliter) of n-pentanol was mixed with 2500 ml (milliliter) of n-butanol, and 5% (percent) by weight of hexamethyldisiloxane (HMDSO) was added to the resulting mixture, and 10% (percent) by weight of methoxytrimethylsilane (MTMS) was then added thereto, based on the total weight of the solvent. About 750 g (gram) of a silica wet gel was put into the resulting mixture, and, when moisture was separated from the reaction resultant in a condenser while maintaining a pressure in a reactor to a pressure level of 120 mmHg (millimeter Hg) at 55° C. (centigrade) and the solvent was recovered and refluxed, all of the moisture was separated from the wet gel within 60 minutes. Then, the solvent was physically recovered in a dehydrator (e.g. centrifuge and filtering systems) until a weight ratio of a solid phase and the solvent is in a range of 1:4 to 1:5, and the wet gel sample was transferred to a fluid bed dispersion drying apparatus as configured in FIG. 9, and then dried in the fluid bed dispersion drying apparatus. A temperature of a fluid bed dispersion drying apparatus was adjusted to a temperature level of 150° C. (centigrade), raw materials were fed continuously, the silica power was primarily captured in an upper portion of the fluid bed dispersion drying apparatus using a Cyclone collector, and then collected using a bag filter. In this case, the evaporated solvent was collected in a condensation system provided with a cooling machine.

The aerogel prepared thus had a permanently hydrophobic surface, and showed a specific surface area of 620 m2/g (square meter/gram). Also, 96% (percent) by weight of the solvent was recovered.

Example 3

A water glass solution (a solution in which 35 wt % (weight percent) of sodium silicate solution is diluted 3 times with water) was added to 5 L of 1N hydrochloric acid solution at a room temperature while stirring until the pH of the resulting solution is adjusted to pH 3.5. After about 30 minutes of the stirring, 250 mL of a 5 wt % (weight percent) JFC™ (trademark)(Shanghai Capital Corporation)(surfactant) solution was added to the water glass solution, and pH of the resulting solution was slowly increased to pH 5 with the addition of water glass. Gel started to appear when the water glass solution was further stirred for about 2 hours. The wet gel prepared thus was washed several times with a sufficient amount of distilled water so as to remove Na ions, Cl ions and the remaining surfactant, all of which are present inside the wet gel, and dehydrated through the sufficient filtering. Then, 400 ml (milliliter) of n-pentanol was mixed with 2500 ml (milliliter) of n-butanol, and 5% (percent) by weight of hexamethyldisiloxane (HMDSO) was added to the resulting mixture, and 10% (percent) by weight of methoxytrimethylsilane (MTMS) was then added thereto, based on the total weight of the solvent. About 750 g (gram) of a silica wet gel was put into the resulting mixture, and the moisture was separated in a condenser while maintaining a pressure in a reactor to a pressure level of 120 mmHg (millimeter Hg) at 55° C. (centigrade) and the solvent was recovered and refluxed. As a result, the moisture may be completely separated from the wet gel within 60 minutes. Then, the solvent was physically recovered in a dehydrator (e.g. centrifuge and filtering system) until a weight ratio of a solid phase and the solvent is in a range of 1:4 to 1:5, and the wet gel sample was transferred to a fluid bed dispersion drying apparatus as configured in FIG. 9, and then dried in the fluid bed dispersion drying apparatus. A temperature of a fluid bed dispersion drying apparatus was adjusted to a temperature level of 150° C. (centigrade), raw materials were fed continuously, the silica power was primarily captured in an upper portion of the fluid bed dispersion drying apparatus using a Cyclone collector, and then collected using a bag filter. In this case, the evaporated solvent was collected in a condensation system provided with a cooling machine.

The aerogel prepared thus had a permanently hydrophobic surface, and showed a specific surface area of 830 m2/g (square meter/gram). Also, 97% (percent) by weight of the solvent was recovered.

Comparative Example 4

148 mL (milliliter) of hydroxypropyl cellulose (HPC) was added to 5 L (liter) of 1N hydrochloric acid solution, and a water glass solution (a solution in which 35% (percent) by weight of sodium silicate solution is diluted 3 times with water) was also added thereto while stirring at a room temperature until the pH of the resulting solution is adjusted to pH 5. Gel started to appear when the water glass solution was further stirred for about 2 hours. The wet gel prepared thus was washed several times with a sufficient amount of distilled water so as to remove Na ions, Cl ions and the remaining surfactant, all of which are present inside the wet gel, and dehydrated through the sufficient filtering. Then, 400 ml (milliliter) of n-pentanol was mixed with 2500 ml (milliliter) of n-butanol, and 5% (percent) by weight of hexamethyldisiloxane (HMDSO) was added to the resulting mixture, and 10% (percent) by weight of methoxytrimethylsilane (MTMS) was then added thereto, based on the total weight of the solvent. About 750 g (gram) of a silica wet gel was put into the resulting mixture, and the moisture was separated in a condenser while maintaining a pressure in a reactor to a pressure level of 120 mmHg (millimeter Hg) at 55° C. (centigrade) and the solvent was recovered and refluxed. As a result, the moisture may be completely separated from the wet gel within 60 minutes. Then, the solvent was physically recovered in a dehydrator (e.g. centrifuge and filtering systems) until a weight ratio of a solid phase and the solvent is in a range of 1:4 to 1:5, and the wet gel sample was transferred to a fluid bed dispersion drying apparatus as configured in FIG. 9, and then dried in the fluid bed dispersion drying apparatus. A temperature of a fluid bed dispersion drying apparatus was adjusted to a temperature level of 150° C. (centigrade), raw materials were fed continuously, the silica power was primarily captured in an upper portion of the fluid bed dispersion drying apparatus using a Cyclone collector, and then collected using a bag filter. In this case, the evaporated solvent was collected in a condensation system provided with a cooling machine.

The aerogel prepared thus had a permanently hydrophobic surface, and showed a specific surface area of 780 m2/g (square meter/gram). Also, 96% (percent) by weight of the solvent was recovered.

According to the present invention, (1) the method for preparing an aerogel is an epoch-making method capable of preparing a silica aerogel from a wet gel for a short time of less than 60 minutes, wherein the wet gel is prepared using a water glass as a raw material and adding a surfactant at a room temperature, the silica aerogel has a high specific surface area and high functionality, and the silica aerogel is prepared so that its surface can be in the form of permanently hydrophobic powder. In the preparation of the aerogel whose surface is hydrophobic using a water glass, it is the most important thing in the industrial process to maximally shorten the processing time requiring a relatively long reaction time, and it is also important to maximally recover expensive materials such as n-butanol or n-pentanol and the silylizing agent. (2) The conventional methods for preparing an aerogel include complex operations such as a multiple solvent exchange operation and a silylizing operation, or require a long reaction time of several days. Also, there has been an attempt to surface-modify the silica wet gel using an n-butanol solution and a silylizing agent together, and remove moisture from the wet gel, but the surface modification and the moisture removal are achieved only when the reactions are carried out for an extended time from minimum 4 hours to at least 24 hours. Also, about 10% (percent) by weight loss of the used solvent and silylizing agent is inevitable when the used solvent and silylizing agent are recovered according to the conventional methods, and the recovered solvent also has a poor purity. However, the method according to the present invention may be useful to simplify the conventional methods including several operations into one operation and to extraordinarily reduce a reaction temperature, wherein the several operations in the conventional methods includes: surface-modifying a wet gel using an n-butanol solution and a silylizing agent together; removing moisture from the wet gel; filtering the wet gel and drying wet gel powder. (3) The method according to the present invention is very economical and effective since the mixture solution of n-butanol solution and n-pentanol solution may be used as the solvent to significantly reduce the loss of the expensive materials by up to 4% (percent) by weight, and the purity of the silica wet gel may be improved up to 98% (percent) by weight by reducing a moisture content in the recovered and recycled solvent. The improvement of the purity by the number percent (%) in the actual process may produce the enormous economic effects. The aerogel prepared according to the present invention has a high specific surface area by the addition of the surfactant, compared to the aerogel products prepared according to the conventional methods, and therefore it is possible to prepare a permanently hydrophobic aerogel having more excellent insulating characteristics.

The invention claimed is:

1. A method for preparing an aerogel whose surface has permanent hydrophobicity comprising the steps of:
    A) adding a water glass to 0.5-2N HCl at room temperature until the pH of solution is adjusted to 3 to 4;
    B) forming a silica gel by adding 1.5-10% by weight of a non-ionic surfactant to the resulting solution in step A), based on the total weight of the finally prepared silica powder in step F), and by adding water glass so that the solution is under an acidic condition of pH 4-6;
    C) washing the formed silica gel with distilled water and filtering the washed silica gel;
    D) adding a mixture solvent of 1-40% by weight of n-pentanol and 99-60% by weight of n-butanol to the filtered silica gel and further adding a silylizing agent;
    E) putting the mixture solution of the step D) into a reactor, separating the solvent and moisture while maintaining a pressure level of 200 to 30 mmHg at a temperature of 45 to 60° C. in the reactor, and then removing the moisture and refluxing the solvent again, followed by repeating the refluxing until the moisture is completely removed from the silica gel; and
    F) closing a reflux line when the moisture is removed from the silica gel, and drying the solvent from the silica gel until the silica gel is prepared in powder form.

2. The method of claim 1, wherein the non-ionic surfactant is selected from the group consisting of propylene glycol ester, glycerine ester, polyethyleneglycol, and alkylcellulose.

3. The method of claim 1, wherein the silylizing agent is selected from the group consisting of methoxytrimethylsilane (MTMS), hexamethyldisiloxane (HMDSO), hexamethyldisilane (HMDS) and trimethoxymethylsilane (TMMS).

4. A method for preparing an aerogel whose surface has permanent hydrophobicity comprising the steps of:
    A) adding a water glass to 0.5-2N HCl at room temperature until the pH of solution is adjusted to 3 to 4;
    B) forming a silica gel by adding 1.5-10% by weight of a non-ionic surfactant to the resulting solution in step A), based on the total weight of the finally prepared silica powder in step F), and by adding water glass so that the solution is under an acidic condition of pH 4-6;
    C) washing the formed silica gel with distilled water and filtering the washed silica gel;
    D) adding a mixture solvent of 1-40% by weight of n-pentanol and 99-60% by weight of n-butanol to the filtered silica gel and further adding a silylizing agent;
    E) putting the mixture solution of step D) into a reactor, separating the solvent and moisture while maintaining a pressure level of 200 to 30 mmHg at a temperature of 45 to 60° C. in the reactor, and then removing the moisture and refluxing the solvent again, followed by repeating the refluxing until the moisture is completely removed from the silica gel; and
    F) drying the silica gel in a fluid bed dispersion dryer to form a silica gel in powder form and recovering the solvent while the moisture is removed from the silica gel.

5. The method of claim 4, wherein the non-ionic surfactant is selected from the group consisting of propylene glycol ester, glycerine ester, polyethyleneglycol, and alkylcellulose.

6. The method of claim 4, wherein the silylizing agent is selected from the group consisting of methoxytrimethylsilane (MTMS), hexamethyldisiloxane (HMDSO), hexamethyldisilane (HMDS) and trimethoxymethylsilane (TMMS).

7. The method of claim 4, comprising: primarily removing the solvent until a weight ratio of a solid-phase material to the solvent is in a range of 1:3 to 1:5 after moisture is removed from the wet gel, and drying the wet gel and recovering the solvent in a fluid bed dispersion drying apparatus at the same time.

8. The method of claim 1, wherein said aerogel has a specific surface area of from 830 $m^2/g$ to 860 $m^2/g$.

9. The method of claim 1, wherein said mixture solvent is recovered in an amount up to 96% by weight.

* * * * *

UNITED STATES PATENT AND TRADEMARK OFFICE
CERTIFICATE OF CORRECTION

PATENT NO.       : 8,137,651 B2
APPLICATION NO.  : 12/532648
DATED            : March 20, 2012
INVENTOR(S)      : Dong Jin Yeo It is certified that error appears in the above-identified patent and that said Letters Patent is hereby corrected as shown below:

Column 13, Line 29, Claim 1, before "step" delete "the"

Column 14, Lines 33-38, Claim 7, delete "comprising: primarily removing the solvent until a weight ratio of a solid-phase material to the solvent is in a range of 1:3 to 1:5 after moisture is removed from the wet gel, and drying the wet gel and recovering the solvent in a fluid bed dispersion drying apparatus at the same time." and insert -- wherein, in step E), the solvent is removed until a weight ratio of a solid-phase material to the solvent is in a range of 1:3 to 1:5 after moisture is removed. --

Signed and Sealed this
Thirty-first Day of July, 2012

David J. Kappos
*Director of the United States Patent and Trademark Office*